US011247733B2

(12) United States Patent
Graves et al.

(10) Patent No.: US 11,247,733 B2
(45) Date of Patent: Feb. 15, 2022

(54) DEFORMING WHEELHOUSE STRUCTURE FOR A VEHICLE

(71) Applicant: TOYOTA MOTOR ENGINEERING & MANUFACTURING NORTH AMERICA, INC., Plano, TX (US)

(72) Inventors: William F. Graves, Ann Arbor, MI (US); Faiyaz Mohammed, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 21 days.

(21) Appl. No.: 16/932,456

(22) Filed: Jul. 17, 2020

(65) Prior Publication Data
US 2022/0017151 A1    Jan. 20, 2022

(51) Int. Cl.
B62D 25/18    (2006.01)
B62D 27/02    (2006.01)
B62D 21/15    (2006.01)

(52) U.S. Cl.
CPC ............ B62D 25/18 (2013.01); B62D 21/15 (2013.01); B62D 27/023 (2013.01)

(58) Field of Classification Search
CPC ....... B62D 25/18; B62D 21/15; B62D 27/023
USPC .................................................. 296/198, 30
See application file for complete search history.

(56) References Cited

U.S. PATENT DOCUMENTS

| 4,440,438 | A | * | 4/1984 | Miyoshi ................. | B62D 25/16 296/198 |
| 4,471,992 | A | * | 9/1984 | Matsuura ............... | B62D 25/04 296/198 |
| 5,127,666 | A | * | 7/1992 | Fujinaka ................ | B60G 3/202 280/124.153 |
| 5,580,121 | A | * | 12/1996 | Dange .................. | B62D 25/087 296/181.4 |
| 6,286,867 | B1 | | 9/2001 | Braemig et al. | |
| 6,648,401 | B2 | | 11/2003 | Behnke et al. | |
| 7,946,646 | B2 | * | 5/2011 | Kim ....................... | B62D 25/16 296/198 |

(Continued)

FOREIGN PATENT DOCUMENTS

DE        19956430 A1    5/2001
DE    102010025202 A1    12/2011
(Continued)

Primary Examiner — D Glenn Dayoan
Assistant Examiner — E Turner Hicks
(74) Attorney, Agent, or Firm — Haynes and Boone, LLP

(57) ABSTRACT

Disclosed is a wheelhouse structure of a vehicle, including an inner panel with an inner flange that includes a straight portion, and an outer panel with an outer flange sized and shaped to interface with the inner flange along at least the straight portion. The outer panel includes a stiffening bead situated forward from, or proximate to a forward portion of, the straight portion. The wheelhouse structure also includes a plurality of joins coupling the inner flange to the outer flange, and a gap in the plurality of joins that is aligned with the first stiffening bead. When a rear portion of the wheelhouse structure is subjected to a loading force in a forward direction, the outer panel bends in locations proximate to the stiffening bead more easily than in locations remote from the stiffening bead.

19 Claims, 19 Drawing Sheets

(56) References Cited

U.S. PATENT DOCUMENTS

| | | | | |
|---|---|---|---|---|
| 8,287,035 B2* | 10/2012 | Bufe | ................ | B62D 25/16 |
| | | | | 296/203.01 |
| 8,789,876 B2* | 7/2014 | Sera | ................ | B62D 25/16 |
| | | | | 296/193.08 |
| 9,162,710 B1 | 10/2015 | Yamamoto | | |
| 10,023,240 B2 | 7/2018 | Mildner et al. | | |
| 10,494,031 B2* | 12/2019 | Masuda | ............ | B62D 25/088 |
| 2008/0007093 A1* | 1/2008 | Andou | ............ | B62D 25/088 |
| | | | | 296/193.08 |
| 2014/0217781 A1* | 8/2014 | Witkop | ............ | B62D 25/161 |
| | | | | 296/198 |
| 2015/0284033 A1* | 10/2015 | Yamamoto | ......... | B62D 27/02 |
| | | | | 296/193.05 |
| 2018/0050731 A1* | 2/2018 | Job | ............ | B62D 25/18 |
| 2018/0251083 A1* | 9/2018 | Zentgraf | ............ | B60R 13/04 |
| 2019/0144053 A1* | 5/2019 | Bednarchik | ......... | B62D 25/161 |
| | | | | 296/198 |
| 2019/0300067 A1 | 10/2019 | Ogawa et al. | | |
| 2020/0001931 A1* | 1/2020 | Connor | ............ | B62D 25/161 |
| 2020/0317273 A1* | 10/2020 | Nishimura | ......... | B62D 25/025 |
| 2021/0261201 A1* | 8/2021 | Earl | ............ | B62D 25/18 |

FOREIGN PATENT DOCUMENTS

| | | |
|---|---|---|
| DE | 102012019936 A1 | 4/2014 |
| DE | 102015202648 B4 | 12/2018 |
| EP | 1806272 A1 | 11/2007 |
| FR | 2941670 B1 | 8/2010 |
| JP | 3180030 B2 | 6/2001 |
| JP | 4344955 B2 | 10/2009 |
| JP | 2020006906 A | 1/2020 |

* cited by examiner

DEFORMING WHEELHOUSE STRUCTURE FOR A VEHICLE

TECHNICAL FIELD

The subject matter described herein relates to a device, system, and method for improving motor vehicle safety during rear-impact crashes. This device, system, and method has particular but not exclusive utility for automobiles and trucks.

BACKGROUND

The wheels of a vehicle such as a car or truck are each partially surrounded by a wheelhouse, which includes an inner and an outer panel, each typically made of steel, that together provide rigidity to the wheelhouse structure.

Modern vehicles are designed with crash safety in mind. Crash safety is tested both physically (using actual crashes staged under laboratory conditions) and virtually (using computer models and numerical analysis) to determine the forces, accelerations, and deformation, and secondary damage events that a given vehicle design will experience in a given set of crash conditions. One challenging scenario is a rear-impact collision, which occurs for example when the vehicle is struck from behind (e.g., by another vehicle). Deformation of the wheelhouse structure of a rear wheel during a rear impact collision can cause deformation of the wheelhouse inner and outer panels, which may separate or tear. When sharp edges result from such separation or tearing, the wheelhouse inner and/or outer panels can contact the fuel pipe, potentially leading to secondary damage with a potential for fuel leakage, and attendant risk of fire or explosion.

In many vehicles, a spare tire may be located such that in a rear collision, the spare tire and/or the spare tire carrier can load the wheelhouse. Current wheelhouse designs may not take loading from the spare tire or spare tire carrier into account. Such loading may increase the risk of damage to the fuel pipe by the inner and/or outer panels of the wheelhouse during a rear-impact collision. Accordingly, a need exists for improved wheelhouse assemblies that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a deforming rear wheelhouse structure that provides one or more additional novel structural members that reduce the risk of damage to a vehicle's fuel pipe by the wheelhouse inner and outer panels during a rear-impact collision event. The modified wheelhouse design of the present disclosure reduces the risk of separation of the wheelhouse inner and outer panels during such a rear impact collision, and also encourages deformation of the wheelhouse inner and outer panels in a manner that reduces the risk of contact with the fuel pipe. The deforming rear wheelhouse structure incorporates several specific design features to control the deformation of the wheelhouse when loaded by the spare tire in a rear impact. Along the joined flanges of the inner and outer wheelhouse panels, a straighter flange profile, increased weld pitch, and weld gaps at key locations all help to control specific bend points along the flanges. The addition of stiffening beads at key locations on the wheelhouse outer panel help promote a specific bend mode of the wheelhouse flanges and wheelhouse outer panel as the spare tire loads wheelhouse. A more convex shape for the wheelhouse outer panel again helps promote the outward movement of the wheelhouse and specific bend mode of the wheelhouse during the rear impact collision event. In addition, thinner steel for the inner and outer wheelhouse panels not only reduce weight, but also promote bending at the location of the weld gaps and stiffening beads.

The specific shape of the wheelhouse outer panel helps promote a bend mode of the wheelhouse that prevents wheelhouse inner and outer panels from separating and contacting the fuel pipe.

The deforming rear wheelhouse structure disclosed herein has particular, but not exclusive, utility for collision mitigation in automobiles and trucks. One general aspect of the deforming rear wheelhouse structure includes a wheelhouse structure of a vehicle comprising an inner panel, including an inner flange that includes a first substantially straight portion, and an outer panel including: an outer flange sized and shaped to interface with the inner flange along at least a second substantially straight portion in contact with the first substantially straight portion, and a first stiffening bead situated forward from the second substantially straight portion. The wheelhouse structure also includes a plurality of joins coupling the inner flange to the outer flange, and a first gap in the plurality of joins, where the first gap is aligned with the first stiffening bead, such that when a rear portion of the wheelhouse structure is subjected to a loading force in a forward direction, the outer panel bends in locations proximate to the first stiffening bead more easily than in locations remote from the first stiffening bead.

Implementations may include one or more of the following features. The wheelhouse structure where the plurality of joins include spot welds. The wheelhouse structure where a pitch of the plurality of joins is greater within the first and second substantially straight portions. The wheelhouse structure where the outer panel further includes a second stiffening bead situated aft from the second substantially straight portion. The wheelhouse structure where the second gap is aligned with the second stiffening bead. The wheelhouse structure where the first and second stiffening beads are radially oriented. The wheelhouse structure where the first and second stiffening beads are stamped or embossed. The wheelhouse structure where the first and second stiffening beads are welded. The wheelhouse structure where the lower seam couples the outer panel to a body panel of the vehicle. The wheelhouse structure where the lower plurality of joins includes no joins located between radial positions of the first stiffening bead and second stiffening bead. The inner panel and outer panel include steel. A vehicle including the wheelhouse structure. The wheelhouse structure where, when the outer panel bends in locations proximate to the first stiffening bead more easily than in locations remote from the first stiffening bead, the bending prevents the inner panel and outer panel from contacting a fuel pipe of the vehicle.

One general aspect includes a method that includes providing a wheelhouse inner panel, including an inner flange that includes a first substantially straight portion, and providing a wheelhouse outer panel including: an outer flange sized and shaped to interface with the inner flange along at least a second substantially straight portion in contact with the first substantially straight portion, a first stiffening bead situated forward from the second substantially straight portion. The method also includes coupling the inner flange to the outer flange with a plurality of joins, and providing a first gap in the plurality of joins, where the first gap is aligned with the first stiffening bead, such that when a rear portion of the outer panel is subjected to a loading force in a forward direction, the outer panel bends in locations proximate to the first stiffening bead more easily in locations proximate to the first stiffening bead than in locations remote from the first stiffening bead.

Implementations may include one or more of the following features. The method where the inner panel and outer panel include steel, where the plurality of joins include spot welds, and where a pitch of the plurality of joins is greater within the first and second substantially straight portions. The method where the outer panel further includes a second stiffening bead situated aft from the second substantially straight portion, where the method further includes providing a second gap in the plurality of joins, where the second gap is aligned with the second stiffening bead. The method where the first and second stiffening beads are radially oriented, and are formed by stamping, embossing, or welding. The method where the lower seam couples the outer panel to a body panel of a vehicle, where the lower plurality of joins includes no joins located between radial positions of the first stiffening bead and second stiffening bead.

One general aspect includes a system for distributing crash energy within a vehicle. The system includes the vehicle and a wheelhouse structure of the vehicle, including: a metallic inner panel, including an inner flange that includes a first substantially straight portion, and a metallic outer panel including: an outer flange sized and shaped to interface with the inner flange along at least a second substantially straight portion in contact with the first substantially straight portion, a first radially oriented stiffening bead situated forward from the second substantially straight portion, and a second radially oriented stiffening bead situated aft from the second substantially straight portion. The system also includes a plurality of joins coupling the inner flange to the outer flange; a first gap in the plurality of joins, where the first gap is aligned with the first stiffening bead; and a second gap in the plurality of joins, where the second gap is aligned with the second stiffening bead, such that when a rear portion of the wheelhouse structure is subjected to a loading force in a forward direction, the outer panel bends in locations proximate to the first stiffening bead or proximate to the second stiffening bead more easily than in locations remote from the first stiffening bead. Other embodiments may include corresponding computer systems, apparatus, and computer programs recorded on one or more computer storage devices, each configured to perform actions or methods associated with the system.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the deforming rear wheelhouse structure, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
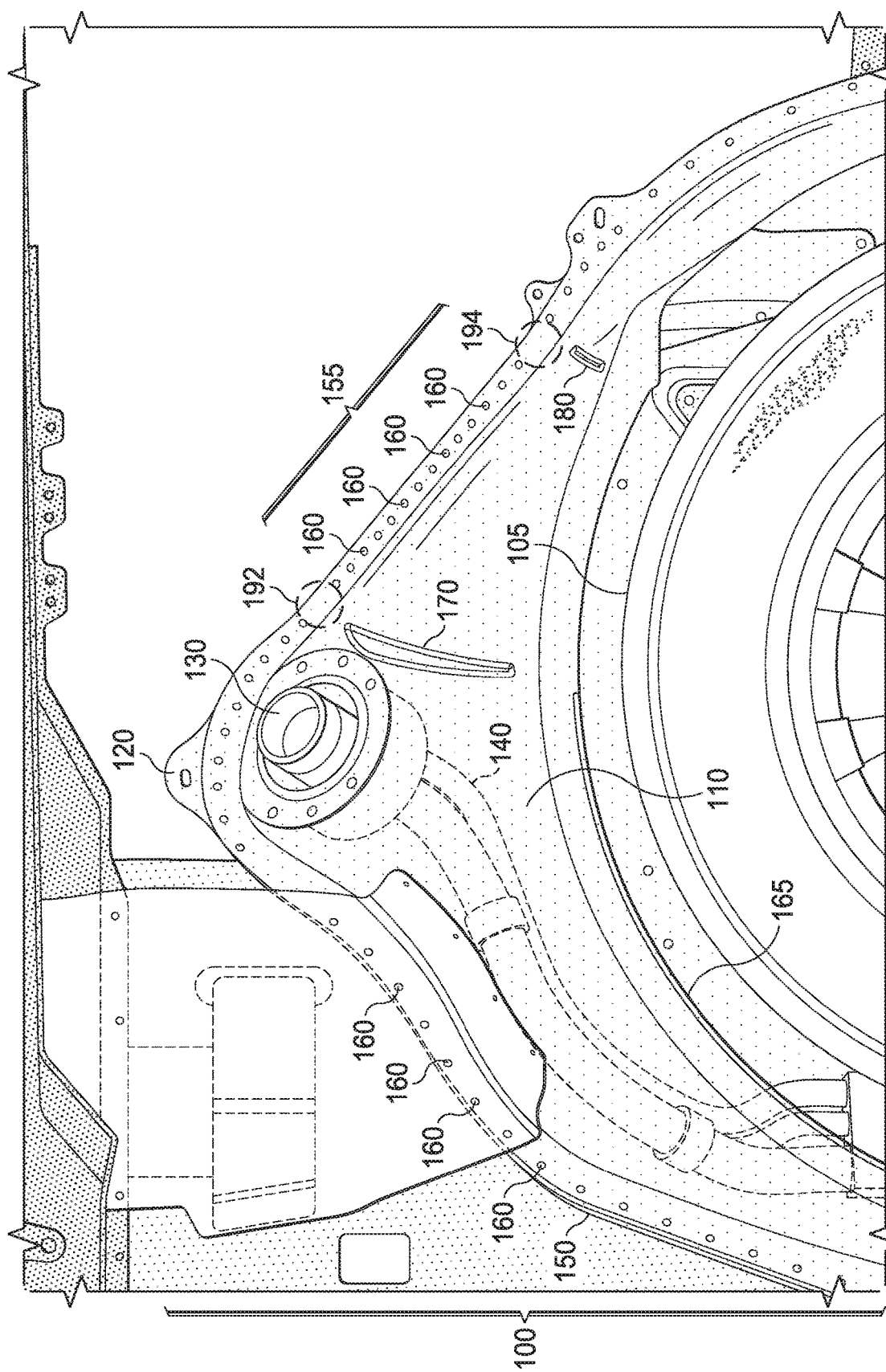
FIG. 1 is a side view of an example deforming rear wheelhouse structure, according to at least one embodiment of the present disclosure.

According to at least one embodiment of the present disclosure, a deforming rear wheelhouse structure is disclosed that provides improved performance in a rear-impact crash. To facilitate this improved performance in a "countermeasure" case with improved design, a number of structural features have been introduced or modified as compared to a "baseline" case.

For example, in the baseline case, the profile of the wheelhouse, particularly the profile proximate the fuel inlet box and fuel inlet tube, is an S-shape curve transitioning from the circumference of the wheelhouse to the fuel inlet box. In the countermeasure case, this profile is replaced with a substantially tangential linear segment. Furthermore, the spot weld pitch along the inner and outer wheelhouse flange, particularly in the substantially tangential linear segment, is altered from the baseline case to include at least two points of increased pitch (e.g. double pitch), creating gaps that define specific bend points and promote controlled deformation along the wheelhouse flange in the event of a rear impact force, such as an impact force associated with a rear collision.

Substantially radial stiffening beads (e.g., stamped or welded linear beads) have also been added to the outermost surface of the wheelhouse outer panel in the countermeasure case, to define specific bend points and provide controlled deformation along the wheelhouse outer panel. In addition, the circumferential weld pattern of the wheelhouse outer panel flange to the body side outer panel has been controlled to omit welds (e.g. spot welds) in the circumferential arc that extends between the bend points to also promote the specific bend mode of the wheelhouse flange and wheelhouse outer panel. The convex shape of the wheelhouse outer panel also helps promote the outward movement of the wheelhouse and the specific bend mode of the wheelhouse. These features of the countermeasure wheelhouse panels are illustrated below and help promote the specific bend mode of the wheelhouse flange and wheelhouse outer panel as a spare tire mounted vertically rearward of the wheelhouse loads the wheelhouse in response to an impact force. These features and the specific shape of the wheelhouse outer panel help promote a bend mode of the wheelhouse that prevents the wheelhouse inner and outer panels from separating and contacting the fuel pipe in response to a rear impact.

These descriptions are provided for exemplary purposes only, and should not be considered to limit the scope of the deforming rear wheelhouse structure. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a side view of an example deforming rear wheelhouse structure 100, according to at least one embodiment of the present disclosure. Visible are the wheel 105, wheelhouse outer panel 110, the (mostly hidden) wheelhouse inner panel 120, and fuel fill port 130, fuel pipe 140. The outer panel 110 and inner panel 120 are mated together and coupled by joins (e.g., spot welds) 160 along a substantially circumferential seam 150 that includes a substantially straight portion 155. The pitch of the joins 160 (e.g., the spacing between the individual spot welds) may be smaller in the substantially straight portion 155. The outer panel 110 also includes stiffening beads 170 and 180 that help to prevent the outer panel 110 from crushing or crumpling in these regions, and instead encourage the outer panel 110 to fold along lines proximate to the stiffening beads 170 and 180. In some embodiments, stiffening bead 170 is disposed forward of, or proximate to a forward portion of, the substantially straight region, and stiffening bead 180 is disposed aft of, or proximate to an aft portion of, the substantially straight region. In some embodiments, the wheelhouse outer panel 110 is attached to a vehicle side outer panel (not pictured) by a spot-welded lower seam 165 that extends circumferentially to the stiffening bead 170, but includes substantially fewer welds, or no welds, in an arc between stiffening bead 170 and stiffening bead 180, in order to facilitate the specific desired bending modes, such as folding of the wheelhouse outer panel 110 proximate to the stiffening beads 170 and 180. In some embodiments, the seam 150 of the deforming rear wheelhouse structure 100 includes two gaps 192 and 194 where no spot welds occur (e.g., one or two skipped welds for each gap). These gaps 192 and 194 help to encourage specific desired bending modes in a rear-impact collision event, and may in some embodiments be substantially aligned with stiffening beads 170 and 180, respectively.

As a result of these features, when the rear portion of the wheelhouse structure 100 is subjected to a loading force in a forward direction due to a rear impact collision, the outer panel bends in locations proximate to the stiffening beads more easily than in locations remote from the stiffening beads. Before continuing, it should be noted that the examples described above are provided for purposes of illustration, and are not intended to be limiting. Other devices and/or device configurations may be utilized to carry out the operations described herein.

Figure 2:
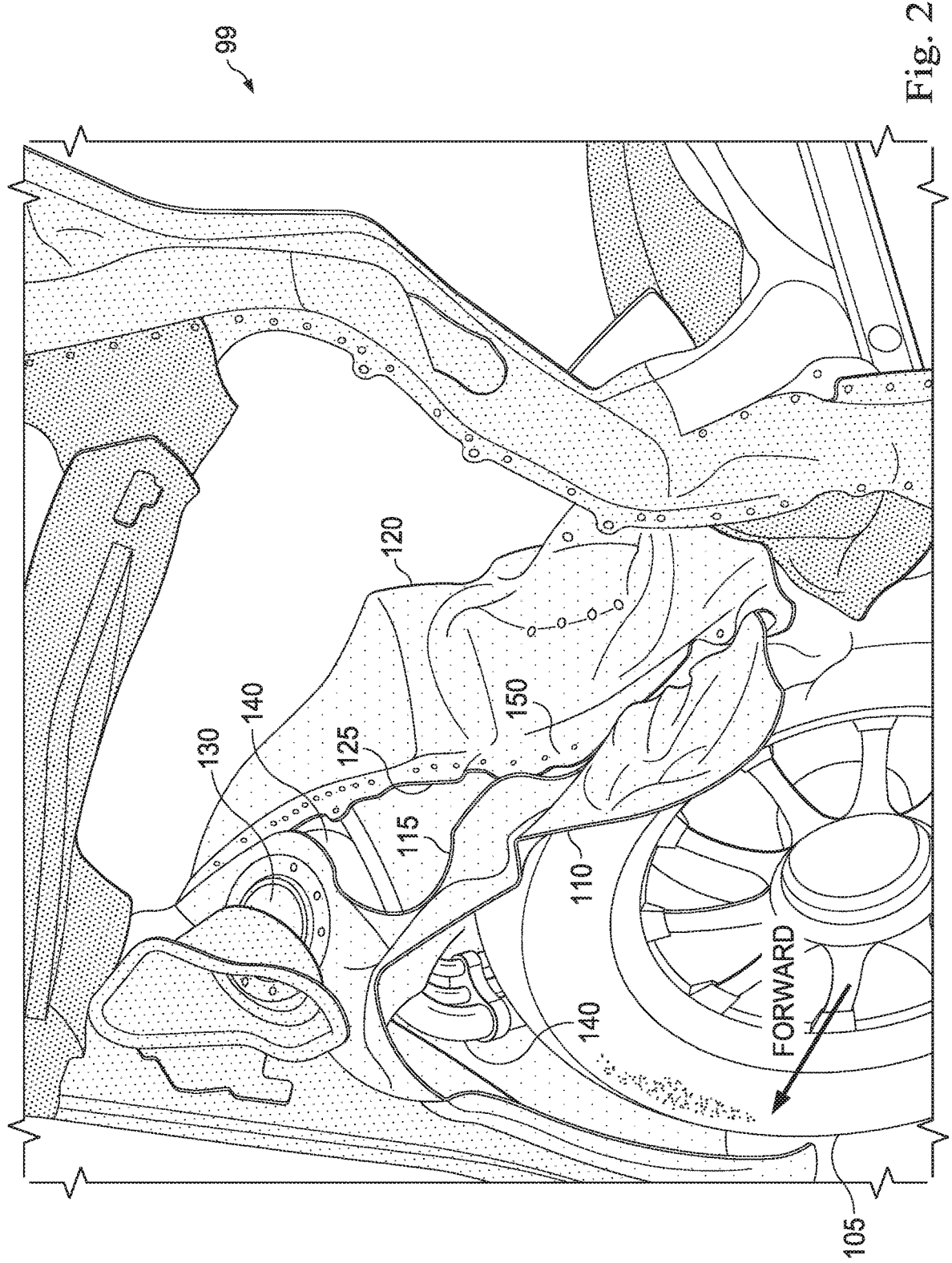
FIG. 2 is a side rear perspective view of a baseline-case wheelhouse structure following a rear-impact collision, according to aspects of the present disclosure.

FIG. 2 is a side rear perspective view of a baseline-case wheelhouse structure 99 following a rear-impact collision, according to aspects of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. As a result of the rear-impact collision, the spot-welded seam 150 that joins the wheelhouse inner panel 120 and outer panel 110 has separated, revealing a jagged wheelhouse outer flange 115 and inner flange 125, each of which has contacted the fuel pipe 140, causing damage. Depending on the dynamics of a particular rear-impact crash and the resultant crumpling of the wheelhouse 99, other portions of the outer panel 110 or inner panel 120 may contact the fuel pipe. It is an object of the present disclosure to prevent, reduce, or lower the likelihood of such contact with, and damage to, the fuel pipe.

Figure 3:
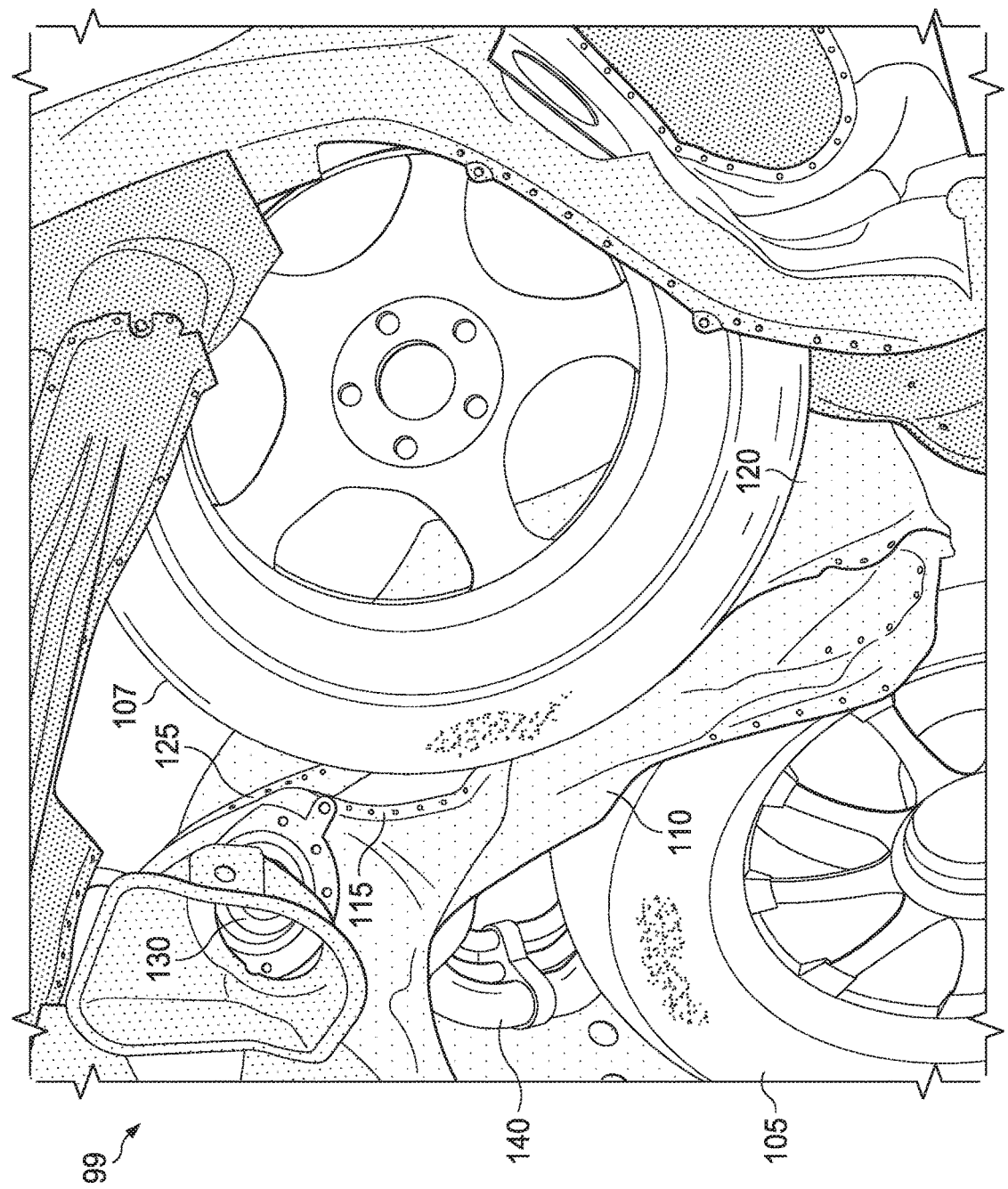
FIG. 3 is a side rear perspective view of a baseline-case wheelhouse structure following a rear-impact collision, according to aspects of the present disclosure.

FIG. 3 is a side rear perspective view of a baseline-case wheelhouse structure 99 following a rear-impact collision, according to aspects of the present disclosure. Visible are the wheel 105, wheelhouse outer panel 110, wheelhouse inner panel 120, fuel intake port 130, fuel pipe 140, wheelhouse outer flange 115 and inner flange 125. FIG. 3 shows the same structure following the same rear-impact crash shown in FIG. 2, except that the spare tire 107 has been rendered visible. As can be seen in this image, impact loading from the spare tire 107 is a major factor in the crumpling of the wheelhouse outer panel 110 and wheelhouse inner panel 120, as a rear portion of the wheelhouse structure is subjected to a loading force in a forward direction by the spare tire 107 during the rear impact crash event.

Figure 4:
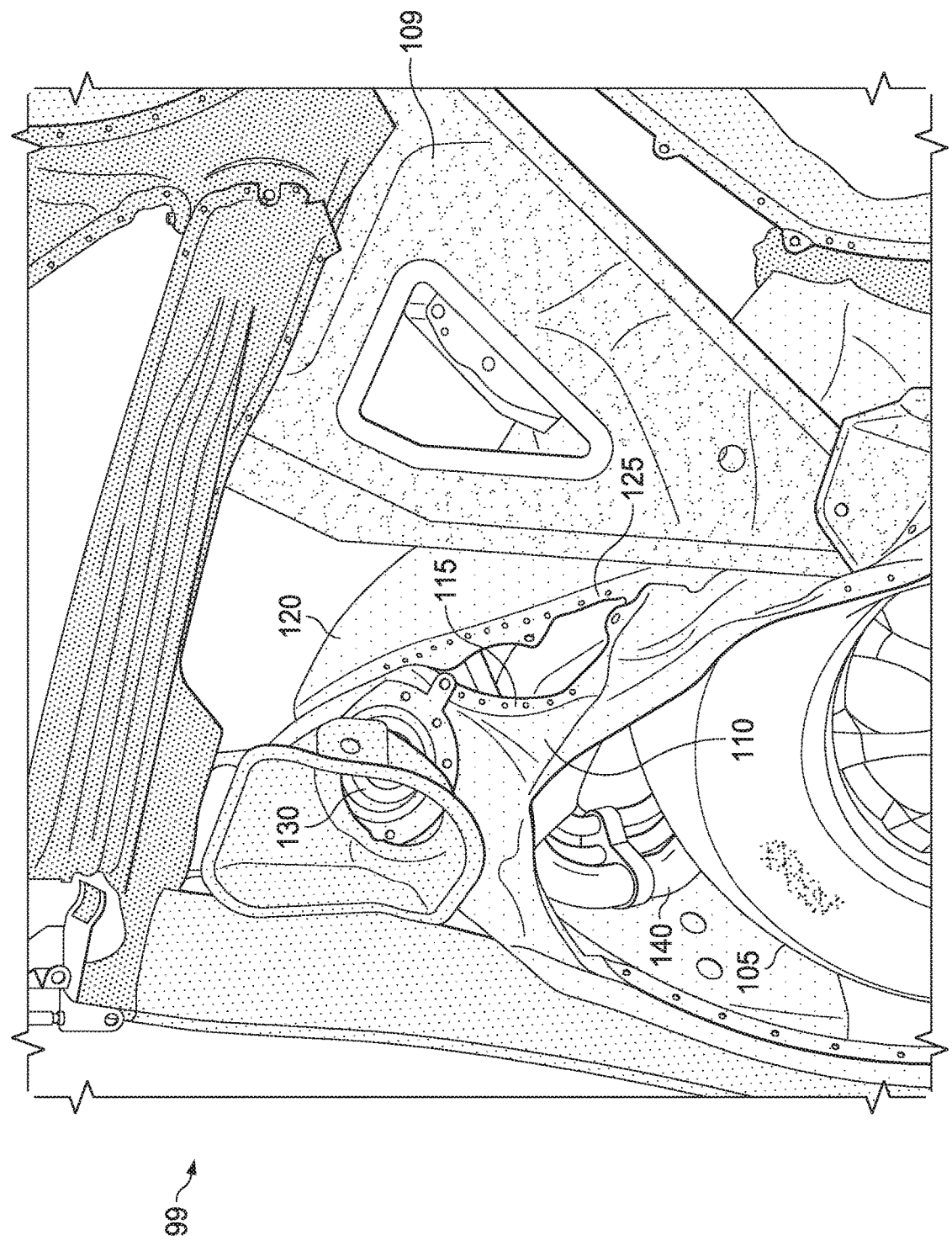
FIG. 4 is a is a side rear perspective view of a baseline-case wheelhouse structure following a rear-impact collision, according to aspects of the present disclosure.

FIG. 4 is a is a side rear perspective view of a baseline-case wheelhouse structure 99 following a rear-impact collision, according to aspects of the present disclosure. Visible are the wheel 105, wheelhouse outer panel 110, wheelhouse inner panel 120, fuel intake port 130, fuel pipe 140, wheelhouse outer flange 115 and inner flange 125. FIG. 4 shows the same structure following the same rear-impact crash shown in FIG. 2, except that the spare tire carrier 109 has been rendered visible. As can be seen in this image, impact loading from the spare tire carrier 109 is a major factor in the crumpling of the wheelhouse outer panel 110 and wheelhouse inner panel 120, as a rear portion of the wheelhouse structure is subjected to a loading force in a forward direction by the spare tire carrier 109 curing the read-impact crash event.

Figure 5:
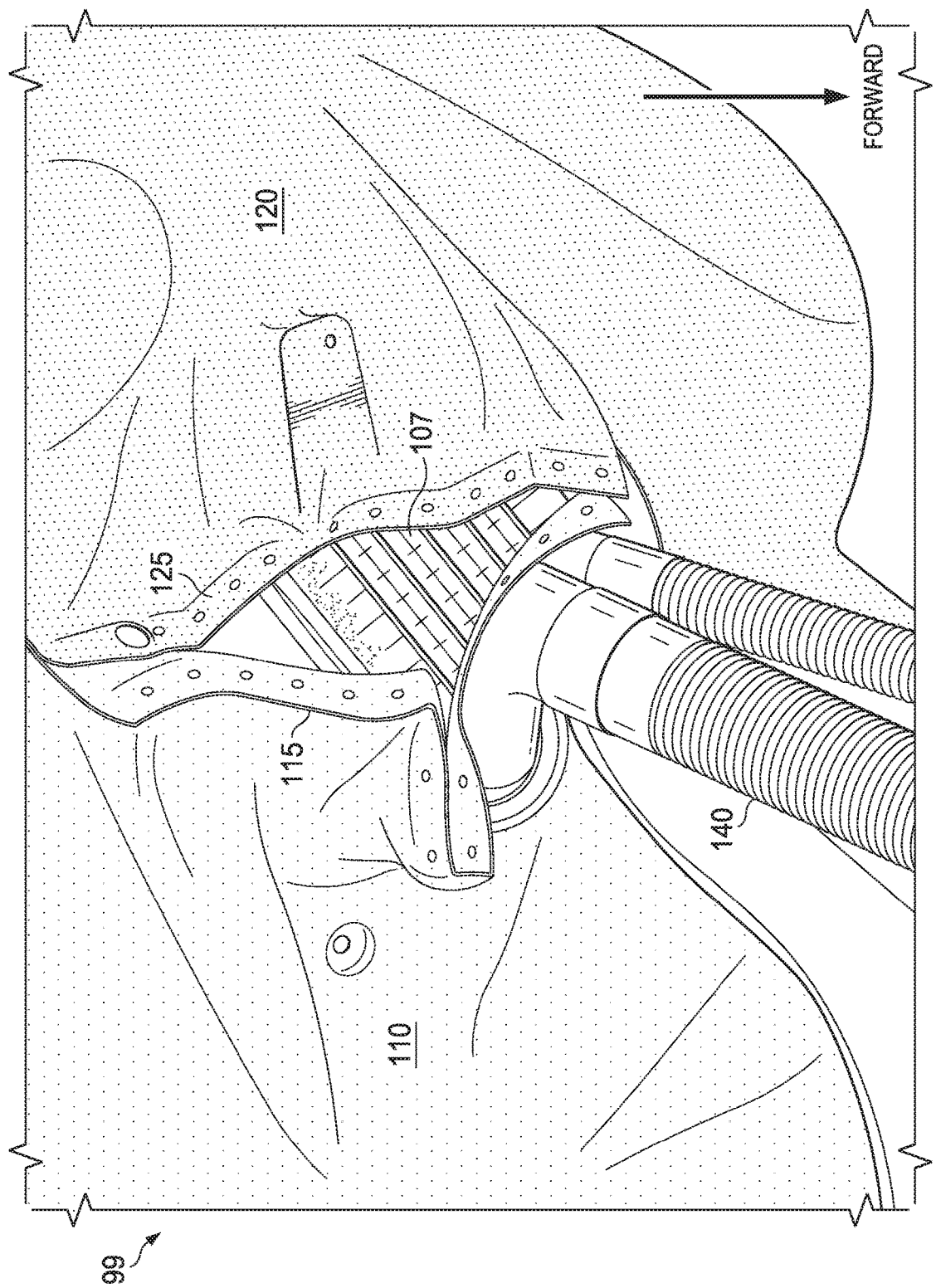
FIG. 5 is an upward-facing inside view of a baseline-case wheelhouse structure following a rear-impact collision, according to aspects of the present disclosure.

FIG. 5 is an upward-facing inside view of a baseline-case wheelhouse structure 99 following a rear-impact collision, according to aspects of the present disclosure. Visible are the spare tire 107, wheelhouse outer panel 110, wheelhouse inner panel 120, fuel intake port 130, fuel pipe 140, wheelhouse outer flange 115 and inner flange 125.

Figure 6:
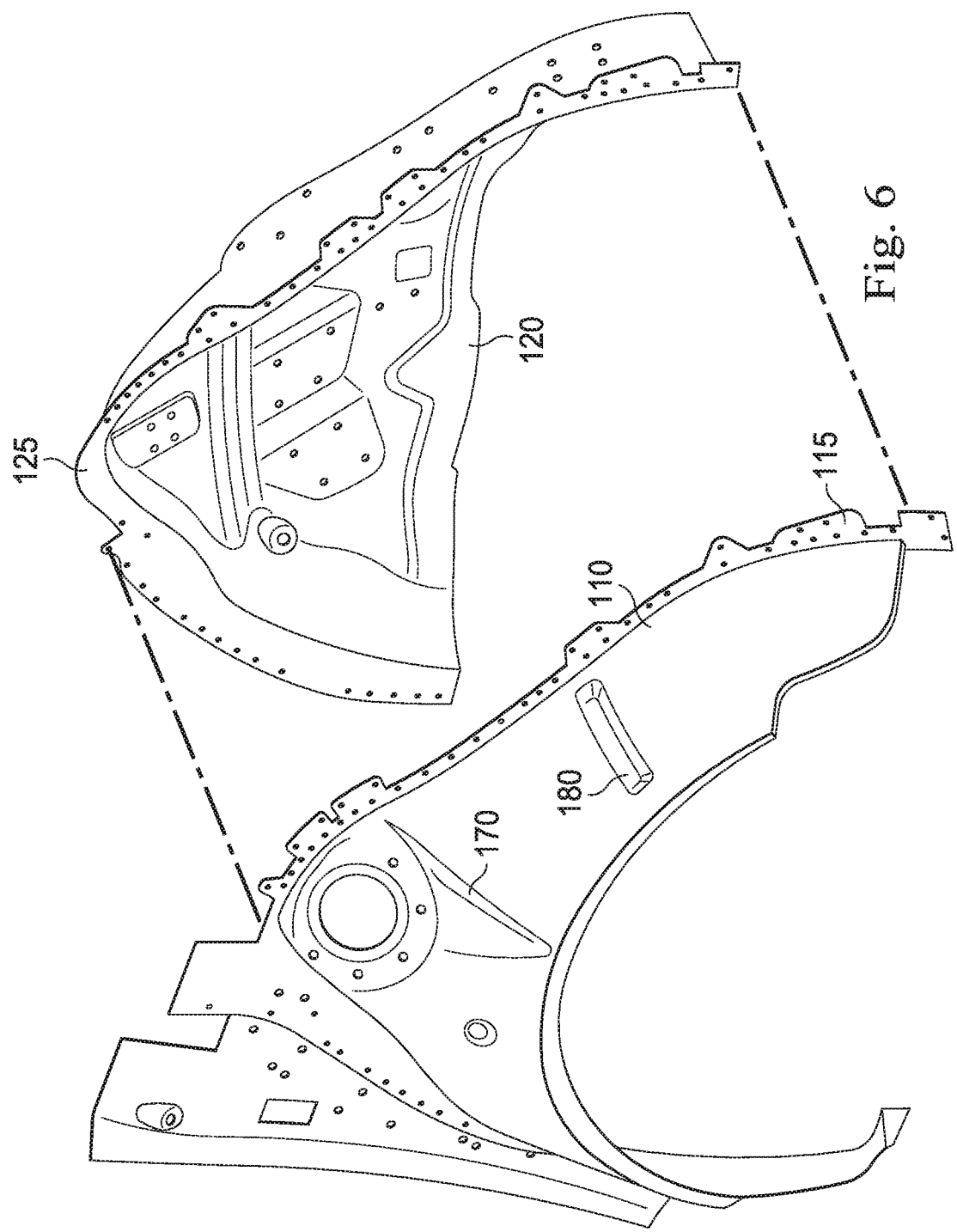
FIG. 6 is a perspective, exploded view of an example deforming rear wheelhouse structure according to at least one embodiment of the present disclosure.

FIG. 6 is a perspective, exploded view of an example deforming rear wheelhouse structure 100 according to at least one embodiment of the present disclosure. Visible are the wheelhouse outer panel 110 and wheelhouse inner panel 120, outer flange 115, inner flange 125, and stiffening beads 170 and 180.

Figure 7:
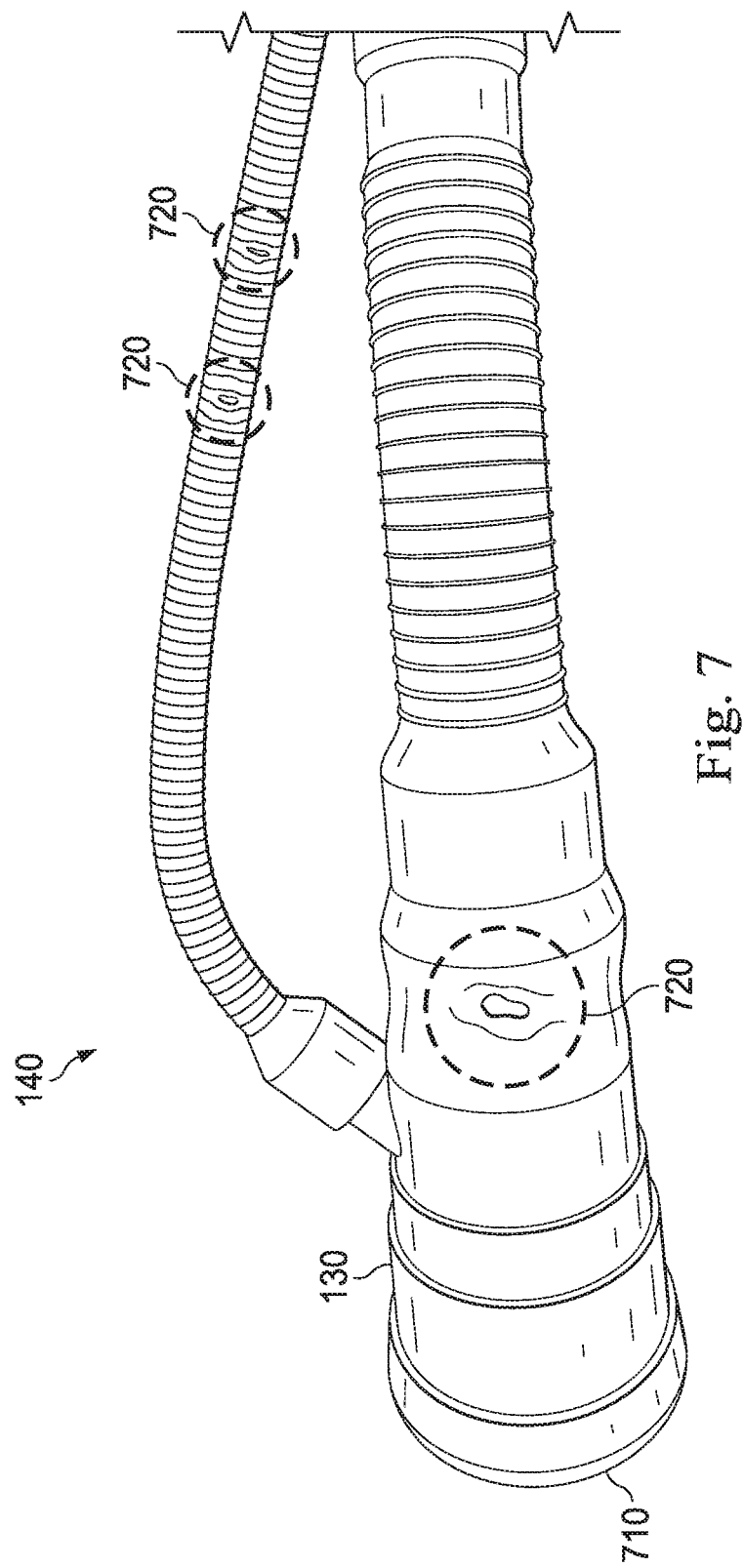
FIG. 7 is a side perspective view of an example fuel pipe following a rear-impact collision in the baseline case, according to aspects of the present disclosure.

FIG. 7 is a side perspective view of an example fuel pipe 140 following a rear-impact collision in the baseline case, according to aspects of the present disclosure. Visible on the fuel pipe 140 are the fuel fill port 130, a gas cap 710, and damaged areas 720 that have been contacted by portions of the wheelhouse outer panel 110 and wheelhouse inner panel 120 during the rear-impact collision. In the countermeasure case, the present disclosure reduces such damage by controlling the bending modes of the wheelhouse outer panel 110 and wheelhouse inner panel 120.

Figure 8:
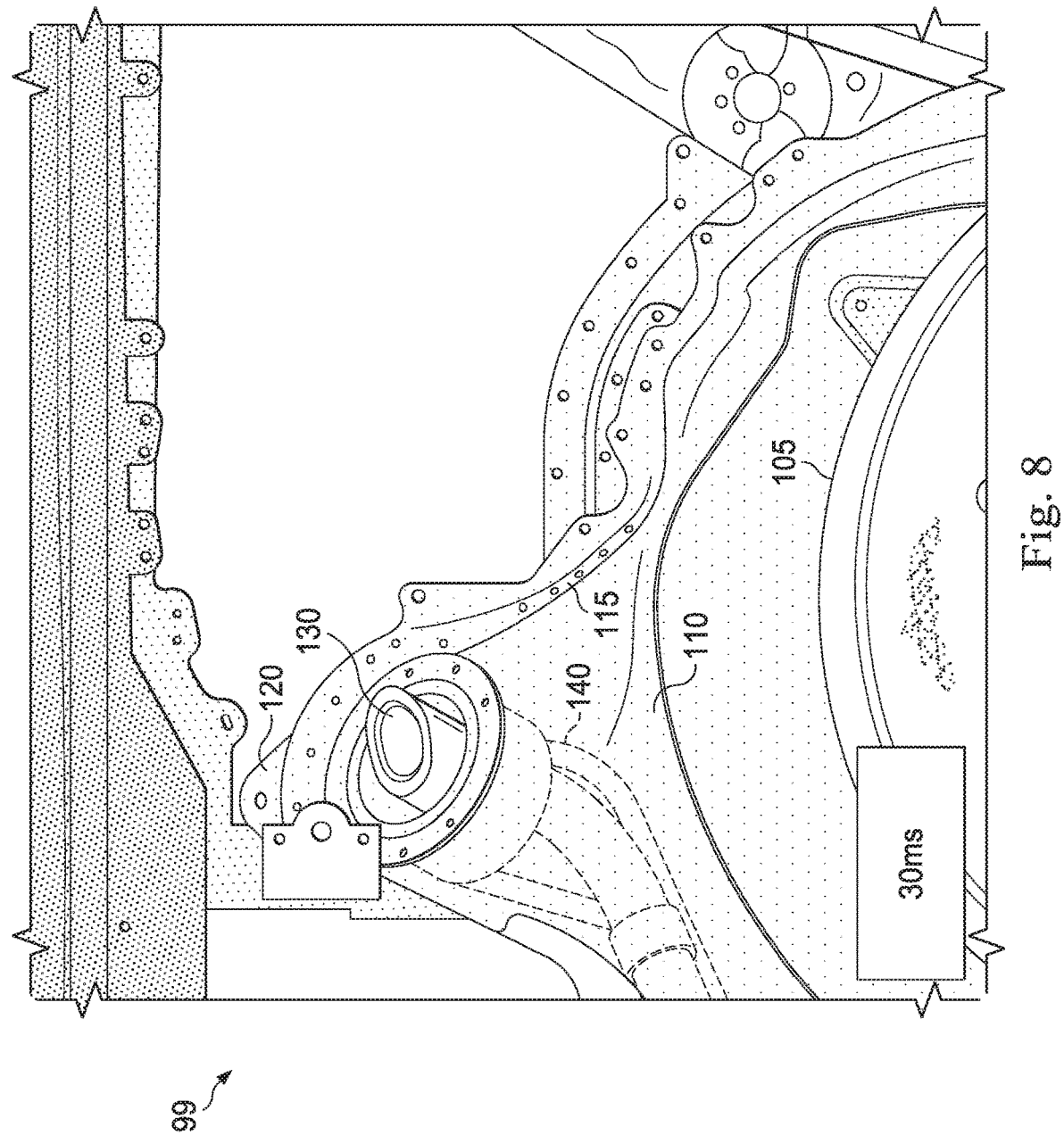
FIG. 8 is a side perspective view of a baseline-case wheelhouse structure at a time point 30 milliseconds into a rear-impact collision event, according to aspects of the present disclosure.

FIG. 8 is a side perspective view of a baseline-case wheelhouse structure 99 at a time point 30 milliseconds into a rear-impact collision event, according to aspects of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. Also visible is the wheelhouse outer flange 115 which, at this time, remains attached to the wheelhouse outer flange (not pictured).

Figure 9:
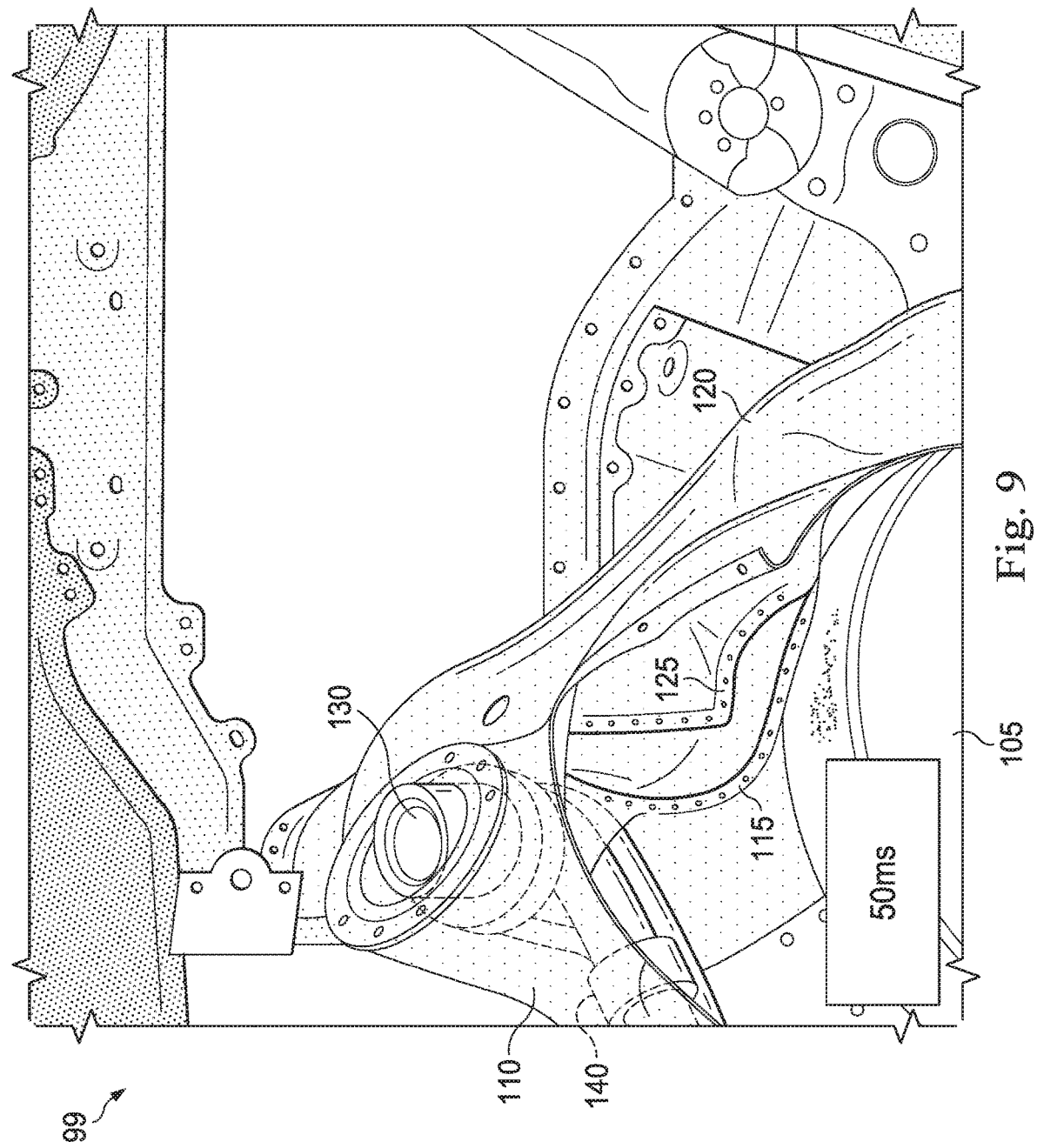
FIG. 9 is a side perspective view of a baseline-case wheelhouse structure at a time point 50 milliseconds into a rear-impact collision event, according to aspects of the present disclosure.

FIG. 9 is a side perspective view of a baseline-case wheelhouse structure 99 at a time point 50 milliseconds into a rear-impact collision event, according to aspects of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear-impact collision. Also visible is the wheelhouse outer flange 115 which, at this time, has separated from the wheelhouse inner flange 125. At this time point, the wheelhouse outer flange 115 is close to contacting the fuel pipe 140.

Figure 10:
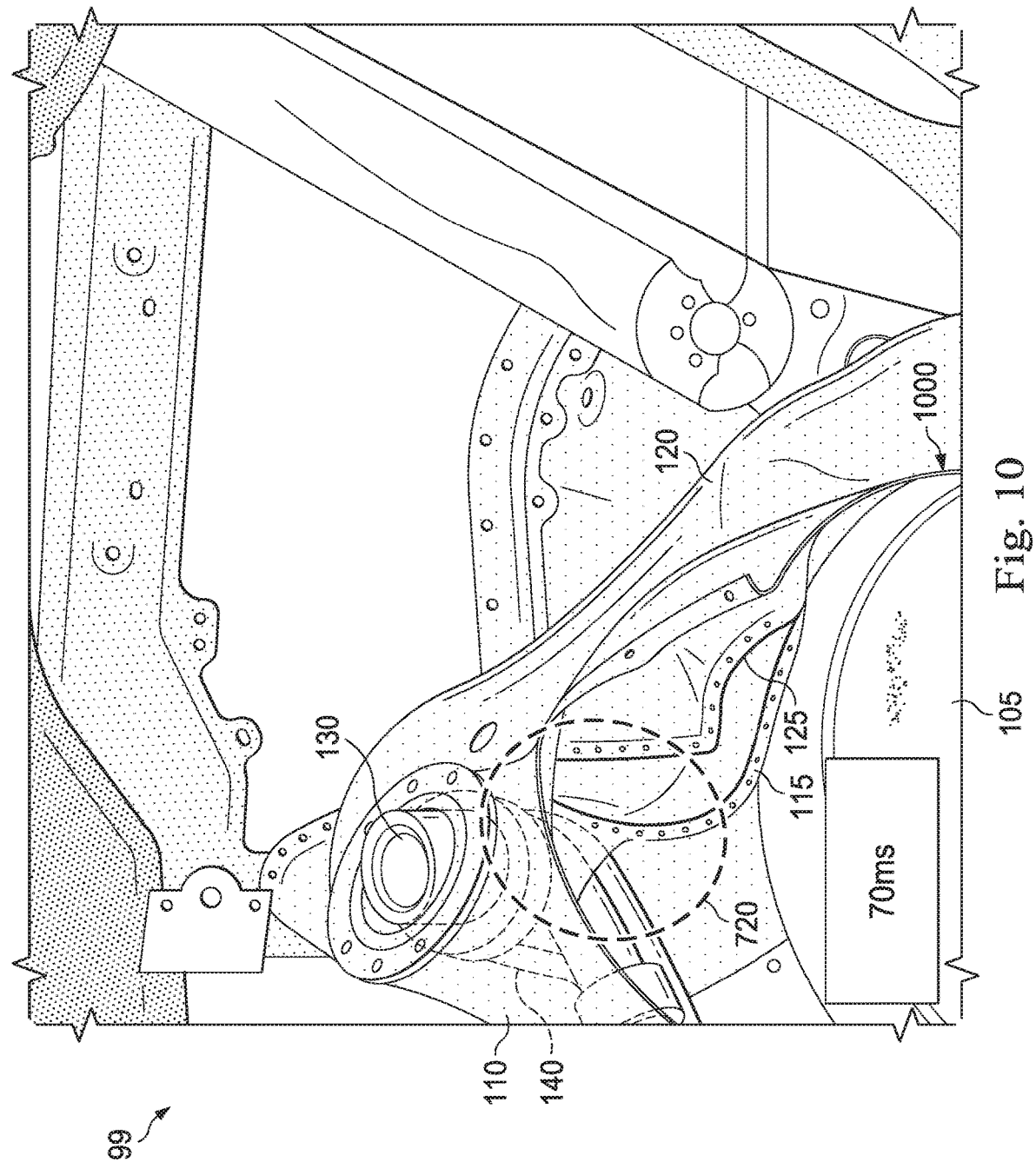
FIG. 10 is a side perspective view of a baseline-case wheelhouse structure at a time point 70 milliseconds into a rear-impact collision event, according to aspects of the present disclosure.

FIG. 10 is a side perspective view of a baseline-case wheelhouse structure 99 at a time point 70 milliseconds into a rear-impact collision event, according to aspects of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. Also visible is the wheelhouse outer flange 115 which, at this time, has separated from the wheelhouse inner flange 125. At this time point, the wheelhouse outer flange 115 and wheelhouse inner flange 125 are both in partial contact with the fuel pipe 140, creating a region of potential damage 720, with attendant risk of fire or explosion.

Figure 11:
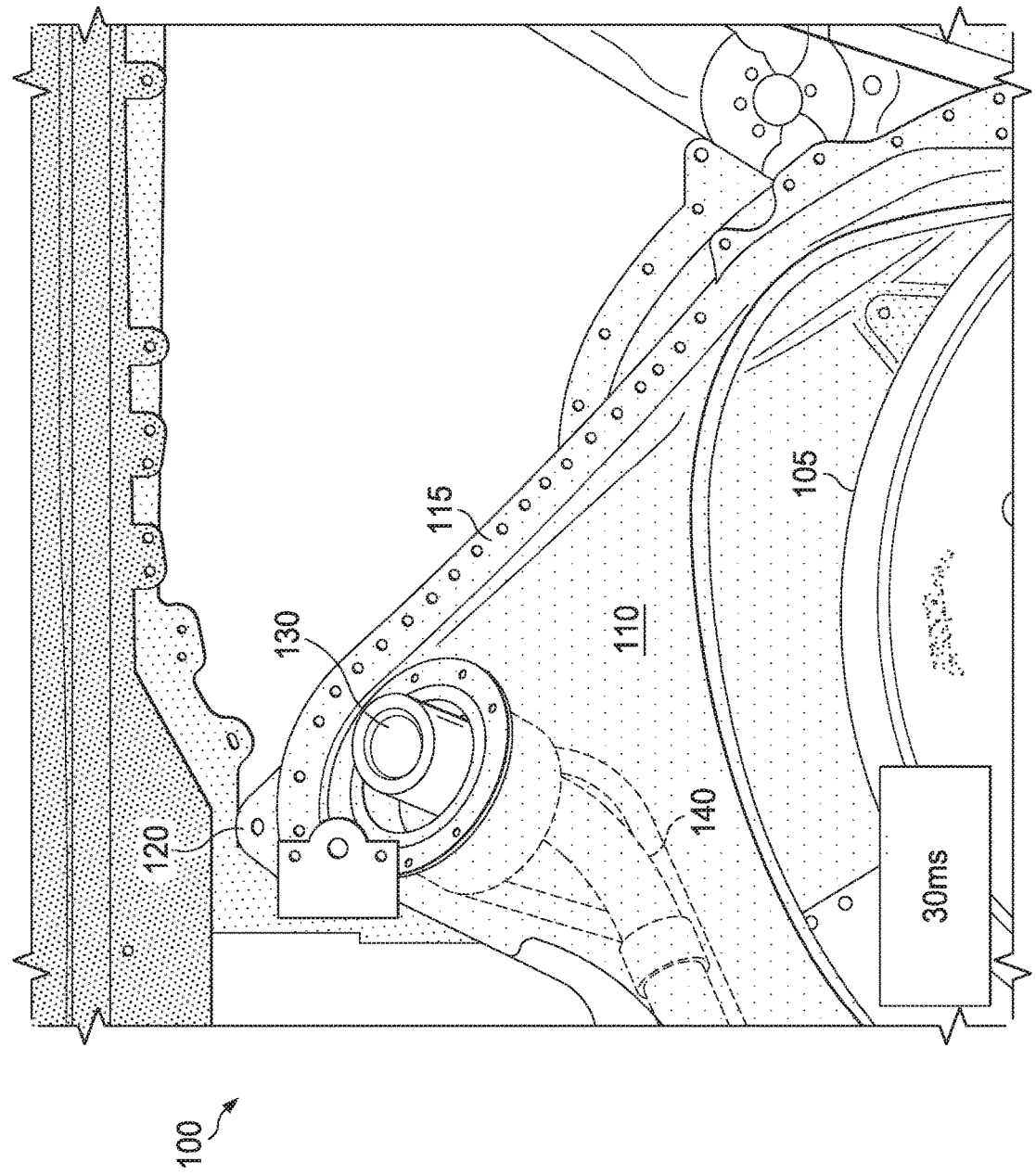
FIG. 11 is a side perspective view of a countermeasure-case, deforming rear wheelhouse structure at a time point 30 milliseconds into a rear-impact collision event, according to at least one embodiment of the present disclosure.

FIG. 11 is a side perspective view of a countermeasure-case, deforming rear wheelhouse structure 100 at a time point 30 milliseconds into a rear-impact collision event, according to at least one embodiment of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. Also visible is the wheelhouse outer flange 115 which, at this time, remains attached to the wheelhouse outer flange (not pictured).

Figure 12:
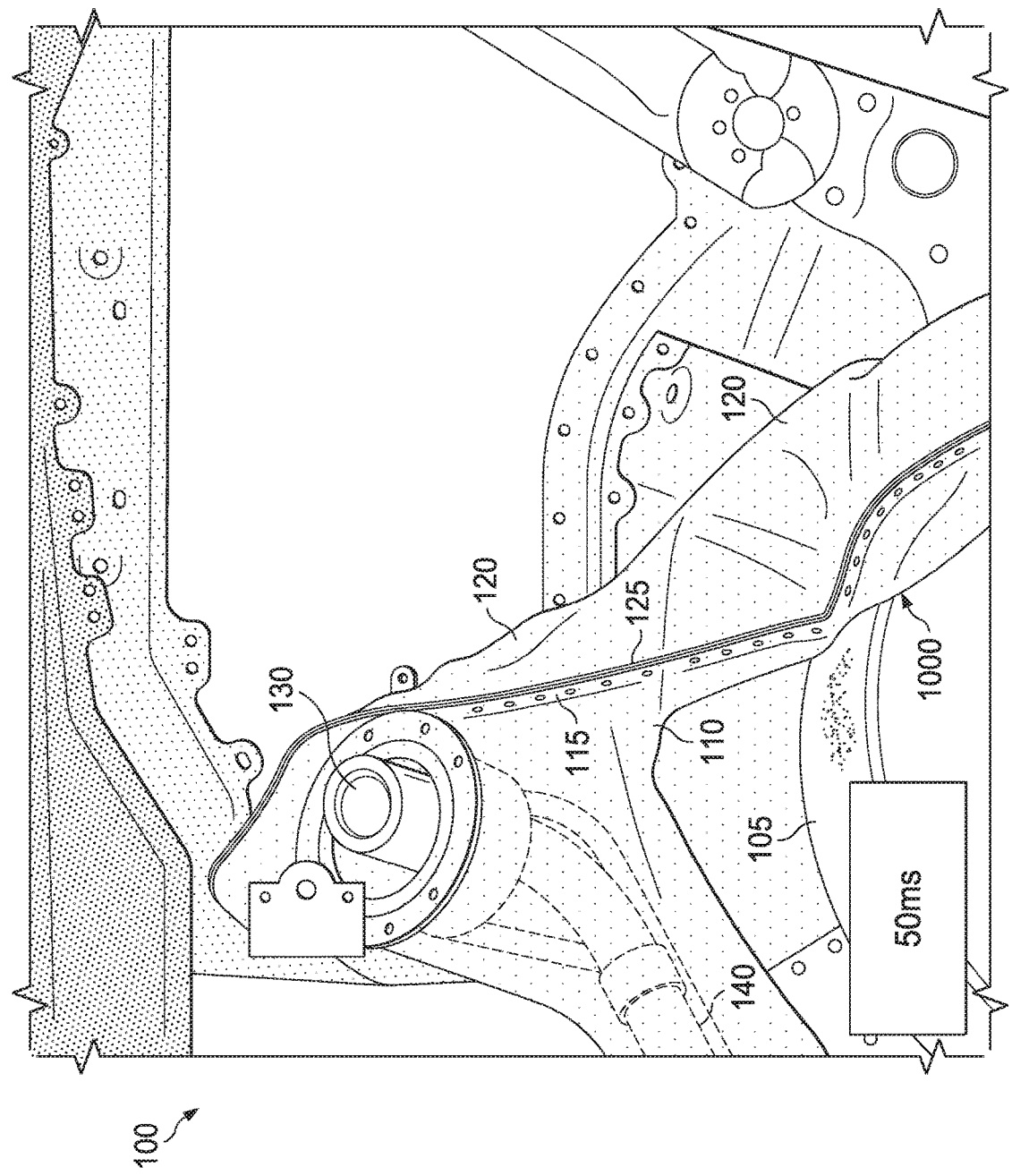
FIG. 12 is a side perspective view of a countermeasure-case, deforming rear wheelhouse structure at a time point 50 milliseconds into a rear-impact collision event, according to at least one embodiment of the present disclosure.

FIG. 12 is a side perspective view of a countermeasure-case, deforming rear wheelhouse structure 100 at a time point 50 milliseconds into a rear-impact collision event, according to at least one embodiment of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. Also visible is the wheelhouse outer flange 115 which, at this time, has folded outward while remaining attached to the wheelhouse inner flange 125. At this time point, neither the wheelhouse outer flange 115 nor the wheelhouse inner flange 125 is close to contacting the fuel pipe 140. However, both flanges are in contact with the wheel 105 at contact point 1000.

Figure 13:
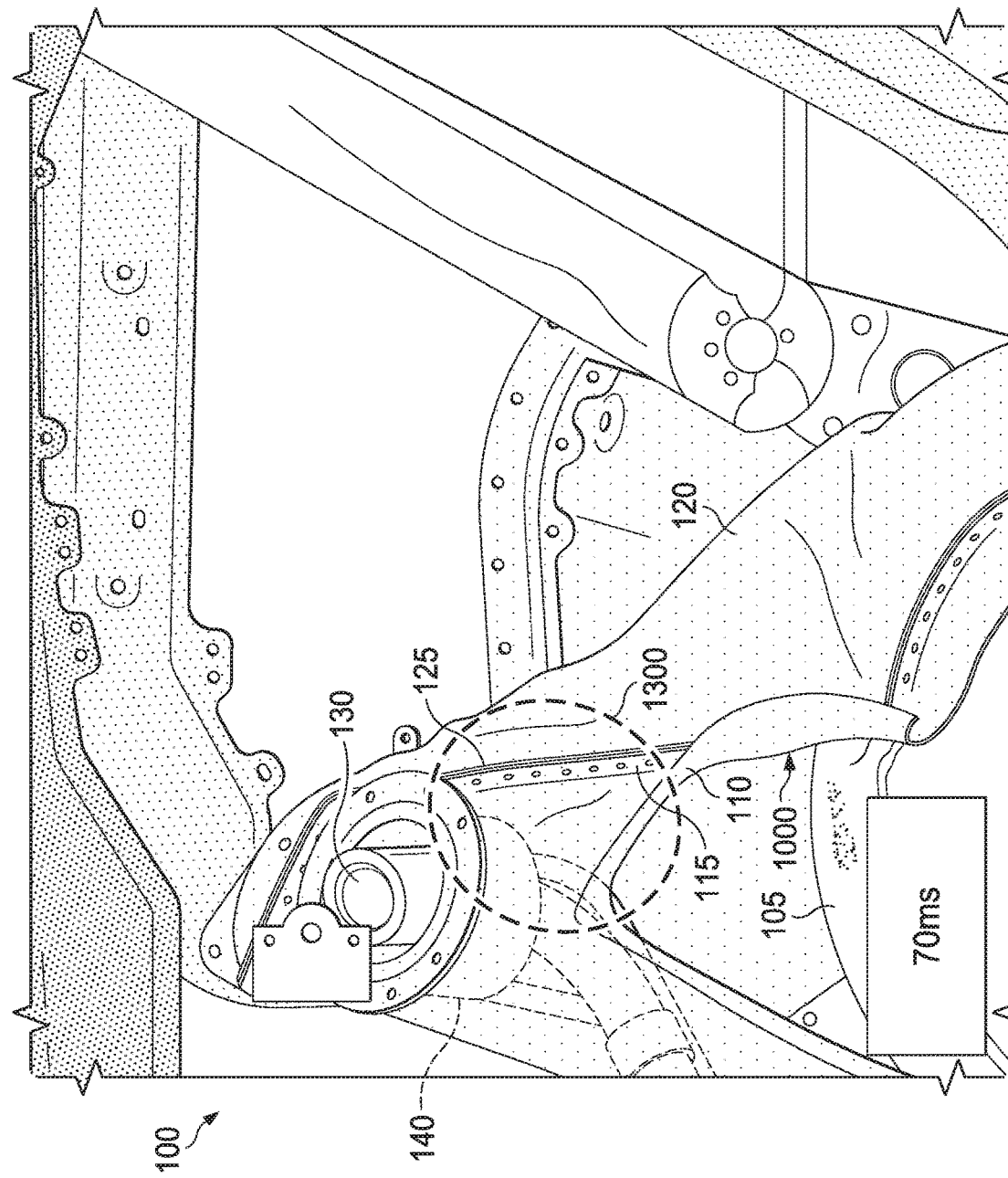
FIG. 13 is a side perspective view of a countermeasure-case, deforming rear wheelhouse structure at a time point 70 milliseconds into a rear-impact collision event, according to at least one embodiment of the present disclosure.

FIG. 13 is a side perspective view of a countermeasure-case, deforming rear wheelhouse structure 100 at a time point 70 milliseconds into a rear-impact collision event, according to at least one embodiment of the present disclosure. Visible are the wheel 105, wheelhouse outer panel 110, wheelhouse inner panel 120, fuel intake port 130, and fuel pipe 140. Not shown (e.g., present but invisible) in this image are the spare tire and spare tire carrier, each of which can in some cases load the wheelhouse inner panel 120 and outer panel 110 during a rear impact collision. Also visible is the wheelhouse outer flange 115 and wheelhouse inner flange 125, which have folded outward but remained joined together. Neither flange is in contact with the fuel pipe 140, thus defining a damage-free region 1300 for the fuel pipe 140 that helps to reduce the risk of damage, fire, or explosion. The flanges 115 and 125 are in contact with the wheel at contact point 1000.

Figure 14:
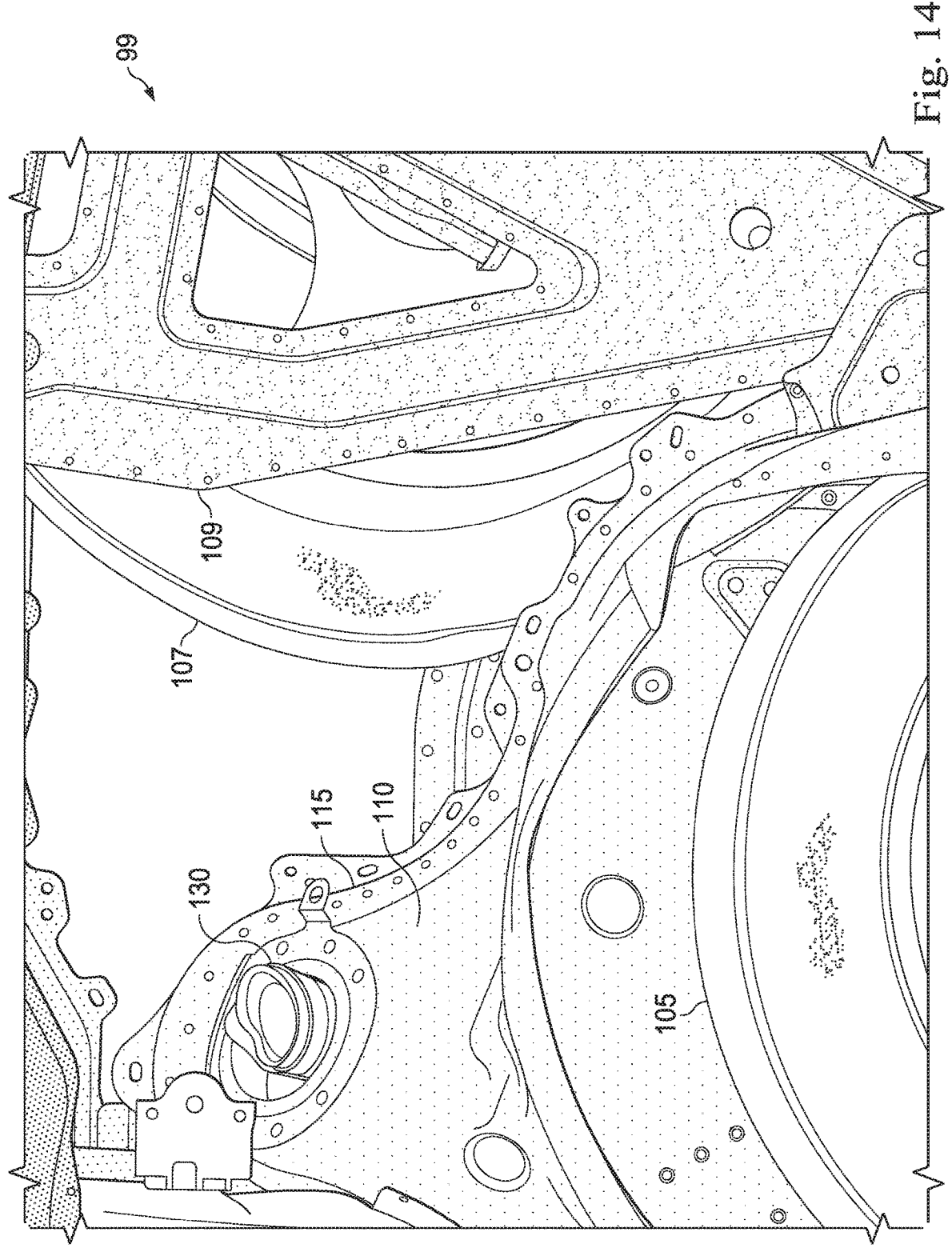
FIG. 14 is a side perspective view of a baseline-case wheelhouse structure at a time point 30 milliseconds into a rear-impact collision event, according to aspects of the present disclosure.

FIG. 14 is a side perspective view of a baseline-case wheelhouse structure 99 at a time point 30 milliseconds into a rear-impact collision event, according to aspects of the present disclosure. Visible are the wheel 105, wheelhouse outer panel 110, and fuel intake port 130. This image is related to FIG. 8, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, remains attached to the wheelhouse outer flange (not pictured).

Figure 15:
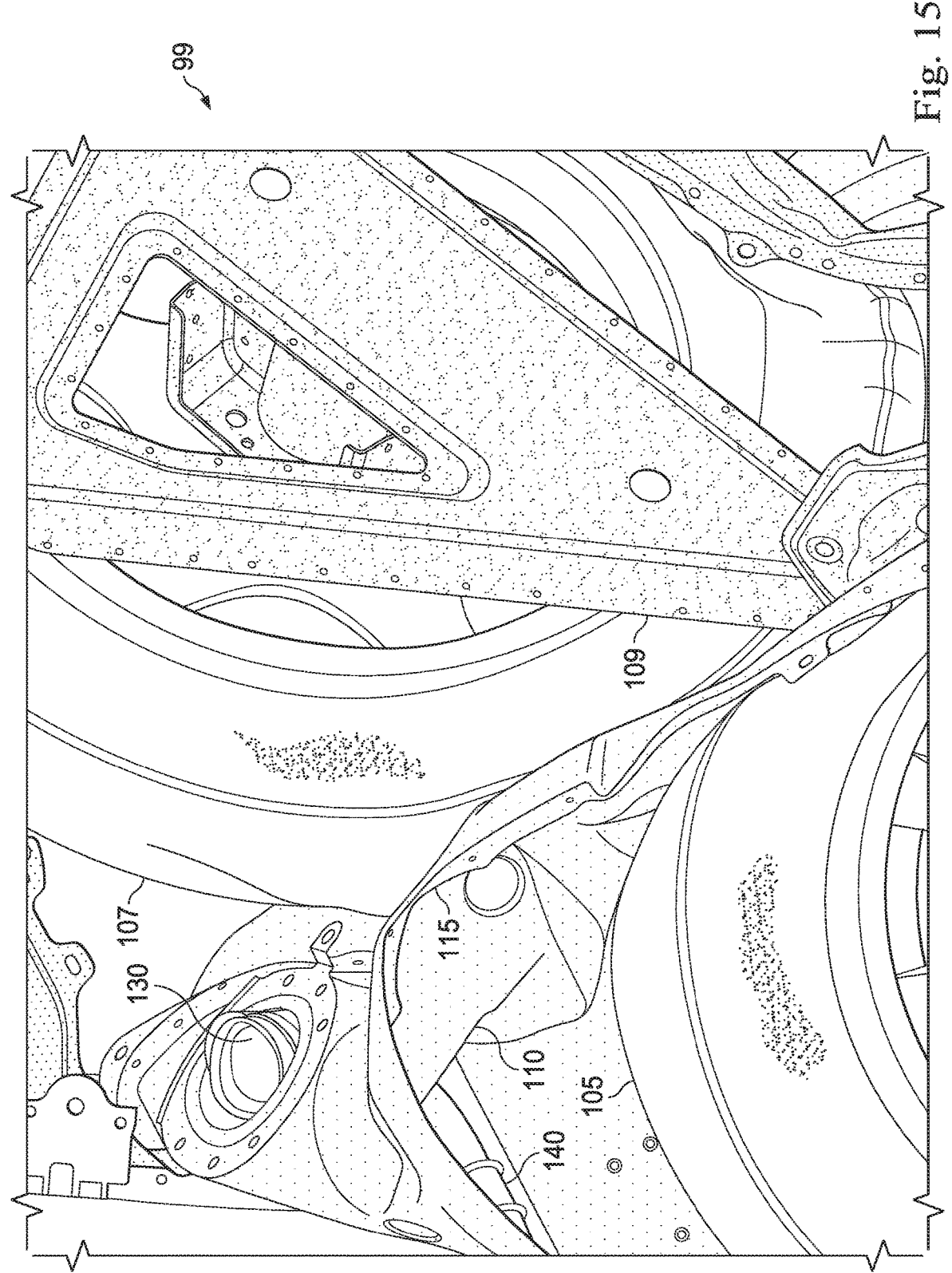
FIG. 15 is a side perspective view of a baseline-case wheelhouse structure at a time point 50 milliseconds into a rear-impact collision event, according to aspects of the present disclosure.

FIG. 15 is a side perspective view of a baseline-case wheelhouse structure 99 at a time point 50 milliseconds into a rear-impact collision event, according to aspects of the present disclosure. Visible are the wheel 105, wheelhouse outer panel 110, fuel intake port 130, and fuel pipe 140. This image is related to FIG. 9, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, has separated from the wheelhouse inner flange 125 (not pictured). At this time point, portions of the wheelhouse outer panel 110 are close to contacting the fuel pipe 140.

Figure 16:
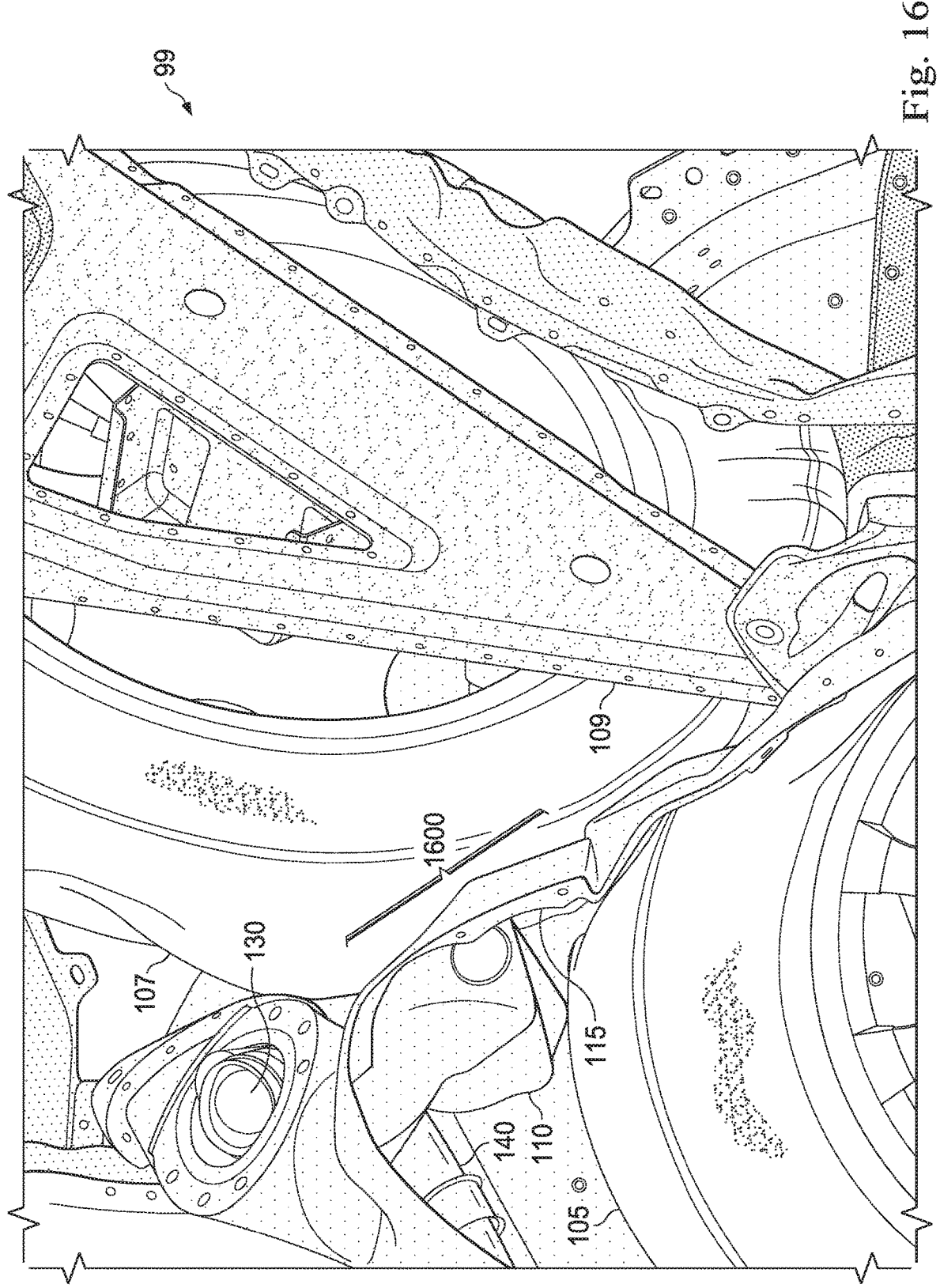
FIG. 16 is a side perspective view of a baseline-case wheelhouse structure at a time point 70 milliseconds into a rear-impact collision event, according to aspects of the present disclosure.

FIG. 16 is a side perspective view of a baseline-case wheelhouse structure 99 at a time point 70 milliseconds into a rear-impact collision event, according to aspects of the present disclosure. Visible are the wheel 105, wheelhouse outer panel 110, wheelhouse inner panel 120, fuel intake port 130, and fuel pipe 140. This image is related to FIG. 10, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, has separated from the wheelhouse inner flange 125 (not pictured). At this time point, portions of the wheelhouse outer panel 110 and wheelhouse inner panel 120 (not pictured) have crumpled in a crumple region 1600, such that the outer panel 110 and inner panel 120 are both in partial contact with the fuel pipe 140, creating potential damage, with attendant risk of fire or explosion.

Figure 17:
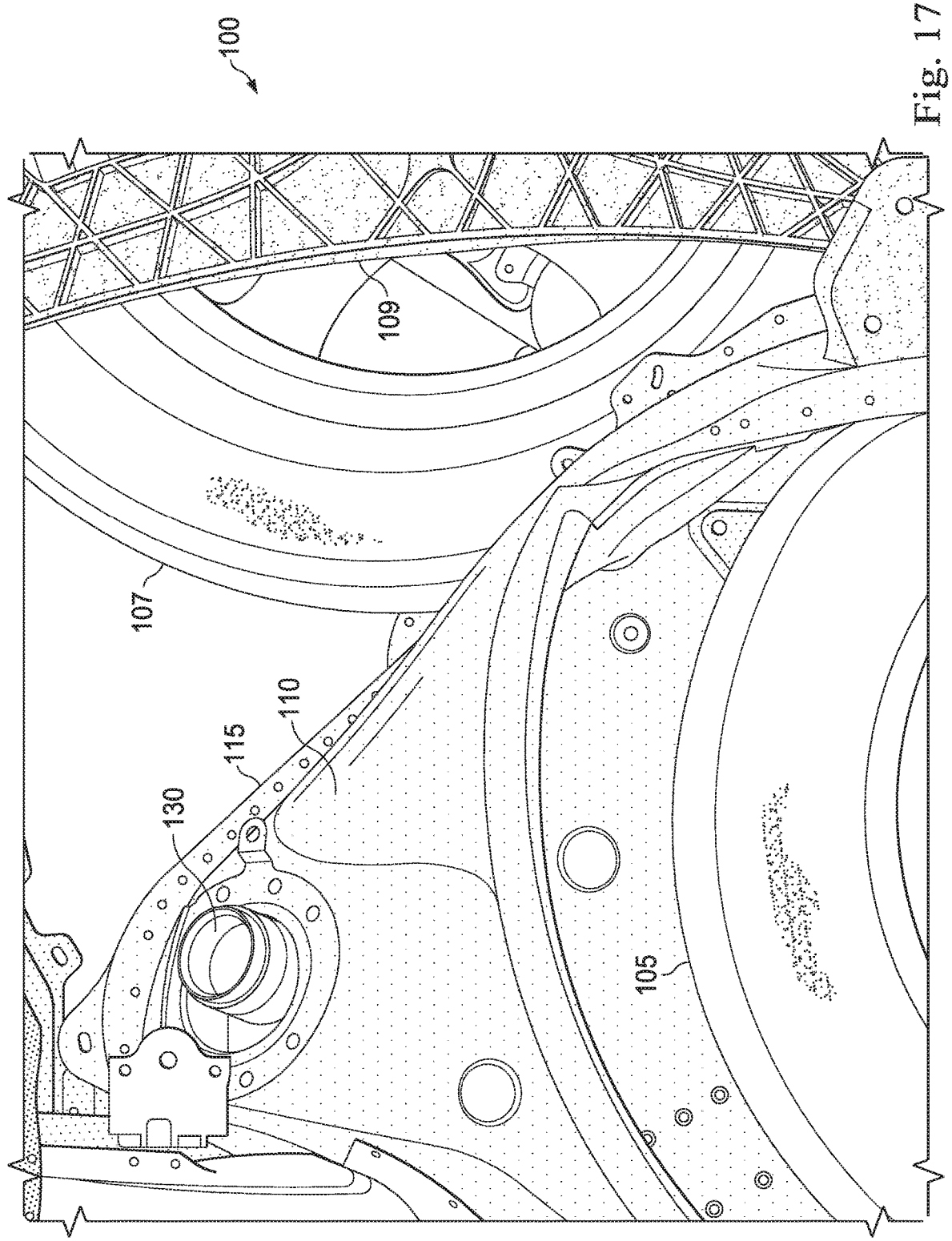
FIG. 17 is a side perspective view of a countermeasure-case, deforming rear wheelhouse structure at a time point 30 milliseconds into a rear-impact collision event, according to at least one embodiment of the present disclosure.

FIG. 17 is a side perspective view of a countermeasure-case, deforming rear wheelhouse structure 100 at a time point 30 milliseconds into a rear-impact collision event, according to at least one embodiment of the present disclosure. Visible are the wheel 105, wheelhouse outer panel 110, and fuel intake port 130. This image is related to FIG. 11, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, remains attached to the wheelhouse outer flange (not pictured).

Figure 18:
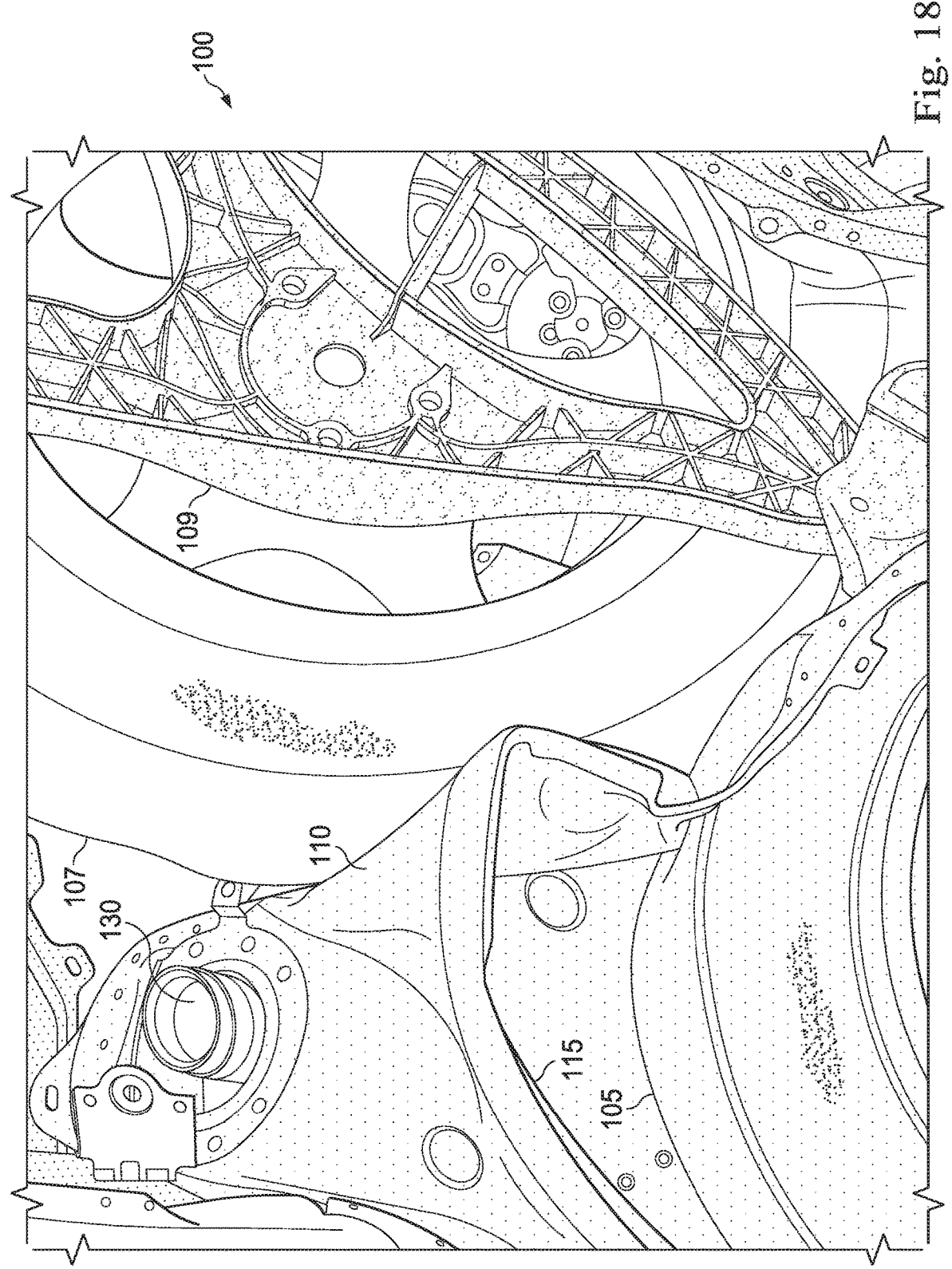
FIG. 18 is a side perspective view of a countermeasure-case, deforming rear wheelhouse structure at a time point 50 milliseconds into a rear-impact collision event, according to at least one embodiment of the present disclosure.

FIG. 18 is a side perspective view of a countermeasure-case, deforming rear wheelhouse structure 100 at a time point 50 milliseconds into a rear-impact collision event, according to at least one embodiment of the present disclosure. Visible are the wheel 105, wheelhouse outer panel 110, fuel intake port 130, and fuel pipe 140. This image is related to FIG. 12, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, has folded outward but remains attached to the wheelhouse inner flange 125 (not pictured). At this time point, no portions of the wheelhouse outer panel 110 or wheelhouse inner panel 120 are close to contacting the fuel pipe 140.

Figure 19:
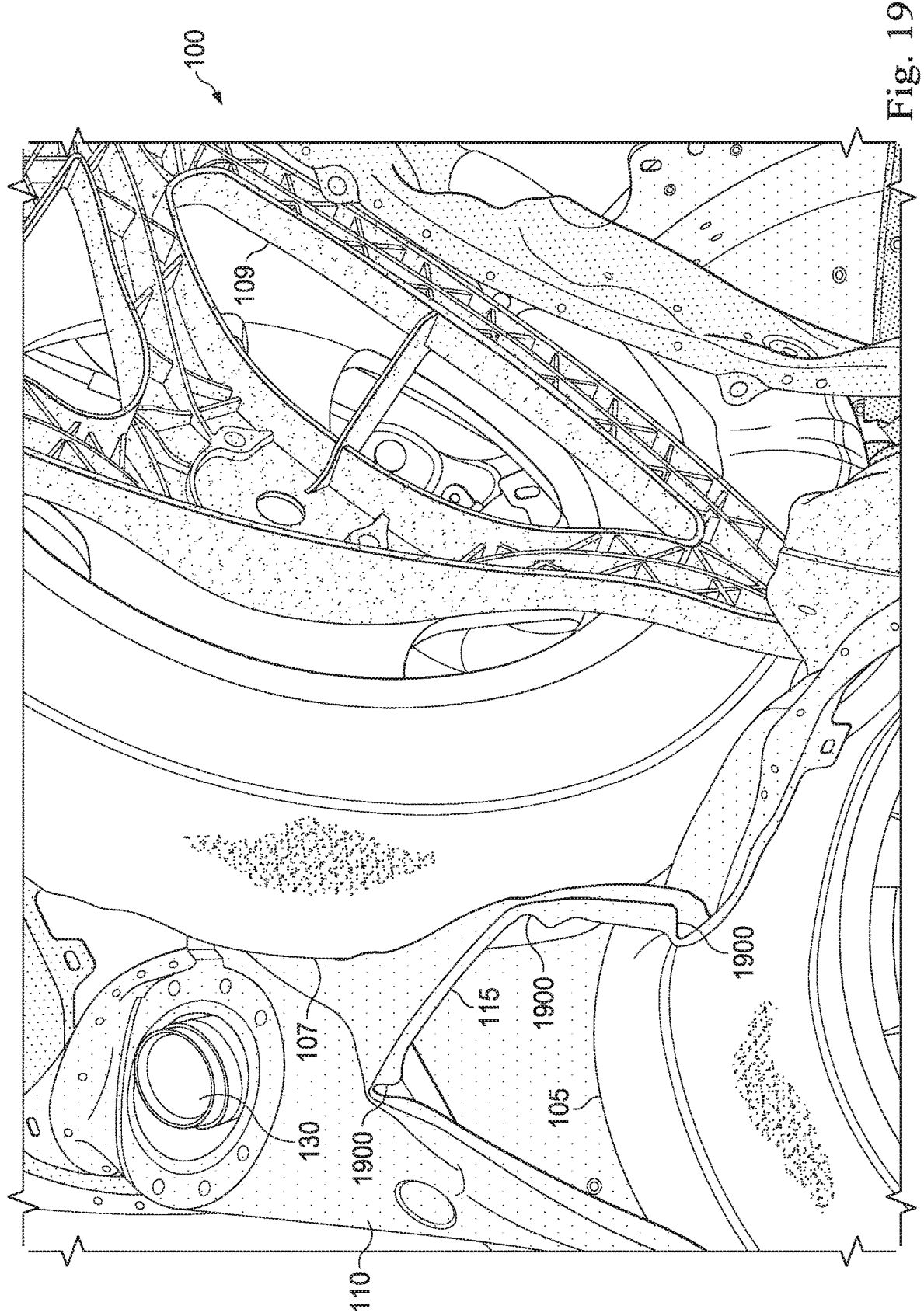
FIG. 19 is a side perspective view of a countermeasure-case, deforming rear wheelhouse structure at a time point 70 milliseconds into a rear-impact collision event, according to at least one embodiment of the present disclosure.

FIG. 19 is a side perspective view of a countermeasure-case, deforming rear wheelhouse structure 100 at a time point 70 milliseconds into a rear-impact collision event, according to at least one embodiment of the present disclosure. Visible are the wheel 105, wheelhouse outer panel 110, wheelhouse inner panel 120, fuel intake port 130, and fuel pipe 140. This image is related to FIG. 13, except that also visible in this image are the spare 107 tire and spare tire carrier 109, each of which is loading the wheelhouse inner panel 120 (not pictured) and wheelhouse outer panel 110 during the rear impact collision event. Also visible is the wheelhouse outer flange 115 which, at this time, has folded in three specific fold locations 1900, whose bending modes are controlled by the features of the deforming rear wheelhouse structure 100 as described herein. At this time point, no portions of the wheelhouse outer panel 110 or wheelhouse inner panel 120 (not pictured) are close to contacting the fuel pipe 140. Thus, the risk of damage, fire, or explosion is greatly reduced vs. the baseline case seen for example in FIG. 16.

As described above in FIG. 1, in the countermeasure case representing the deforming rear wheelhouse structure 100, the outer panel 110 and inner panel 120 are each between approximately 0.6 millimeters and 1.6 millimeters thick, vs. a thickness of 1.6 millimeters or greater for the baseline case. This reduced thickness helps control the bending modes of the deforming wheelhouse structure 100. In the deforming rear wheelhouse structure 100, the outer wheelhouse panel 110 and inner wheelhouse panel 120 are joined by spot welds along a substantially circumferential seam that includes a substantially straight section. The pitch of the spot welds may be smaller in the straight region than in other portions of the seam, and the spot-welded seam includes two gaps where no spot welds occur (e.g., one or two skipped welds for each gap). These gaps also help to encourage bending or folding at the desired fold points 1900. The outer panel 110 also includes stiffening beads that help to prevent the outer panel 110 from crushing or crumpling in these regions, and instead encourage the outer panel 110 to fold along lines proximate to the stiffening beads, thus creating the fold locations 1900 during the rear-impact crash event. In some embodiments, a joined (e.g., spot-welded) lower seam (which joins the outer panel 110 to a vehicle body panel) extends circumferentially to the stiffening bead, but includes substantially fewer joins, or no joins, in an arc between the two stiffening beads 170 and 180, in order to facilitate bending in locations 1900.

Accordingly, it can be seen that the deforming rear wheelhouse structure offers substantial improvement, by improving passenger safety in the challenging rear-impact crash scenario. The deforming rear wheelhouse structure controls the bending modes of the wheelhouse inner and outer panels during the impact, such that the chance of either panel contacting the fuel pipe is minimized.

Depending on the implementation, the deforming rear wheelhouse structure may be made from a variety of different materials, including but not limited to metals, composites, and polymers. Wheelhouse panels may be hollow, solid, honeycombed, ribbed, made of foam, or otherwise constructed in such a way as to provide the desired bending. Joins between panels may comprise any combination of spot welds, linear welds, solder, screws, rivets, rods, pins, brackets, adhesives, caulks, or other joins known in the art. Further, a number of variations are possible on the examples and embodiments described above. For example, the components could be longer, shorter, wider, thicker or of different cross-sectional shape than depicted herein, and may be oriented or angled in alternative manners that serve the same purpose of permitting the wheelhouse structure to deform without contacting the fuel pipe. The technology described herein may be employed in automobiles and trucks of diverse type and design, regardless of their underlying propulsion technologies, and the technology described herein may be employed in front wheelhouses instead of or in addition to rear wheelhouses, and/or may be employed to protect vehicle components other than the fuel pipe.

Accordingly, the logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

In some implementations, components are bolted together to reduce cost. In other embodiments, multiple parts are welded together or co-formed as single parts. It should further be understood that the described technology may be employed in other vehicle types, whether motorized or not, including but not limited to vans, minivans, SUVs, crossover vehicles, RVs, trailers, mobile homes, and food trucks.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the deforming rear wheelhouse structure. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the deforming rear wheelhouse structure as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A wheelhouse structure of a vehicle, comprising:
    an inner panel, comprising an inner flange that includes a first substantially straight portion;
    an outer panel comprising:
        an outer flange sized and shaped to interface with the inner flange along at least a second substantially straight portion in contact with the first substantially straight portion;
        a first stiffening bead situated forward from the second substantially straight portion;
    a plurality of joins coupling the inner flange to the outer flange; and
    a first gap in the plurality of joins, wherein the first gap is aligned with the first stiffening bead,
    wherein when a rear portion of the wheelhouse structure is subjected to a loading force in a forward direction, the outer panel bends in locations proximate to the first stiffening bead more easily than in locations remote from the first stiffening bead.

2. The wheelhouse structure of claim 1, wherein the plurality of joins comprise spot welds.

3. The wheelhouse structure of claim 1, wherein a pitch of the plurality of joins is greater within the first and second substantially straight portions.

4. The wheelhouse structure of claim 1, wherein the outer panel further comprises a second stiffening bead situated aft from the second substantially straight portion.

5. The wheelhouse structure of claim 4, further comprising a second gap in the plurality of joins, wherein the second gap is aligned with the second stiffening bead.

6. The wheelhouse structure of claim 5, wherein the first and second stiffening beads are radially oriented.

7. The wheelhouse structure of claim 5, wherein the first and second stiffening beads are stamped or embossed.

8. The wheelhouse structure of claim 5, wherein the first and second stiffening beads are welded.

9. The wheelhouse structure of claim 5, further comprising a lower seam comprising a lower plurality of joins, wherein the lower seam couples the outer panel to a body panel of the vehicle.

10. The wheelhouse structure of claim 9, wherein the lower plurality of joins includes no joins located between radial positions of the first stiffening bead and second stiffening bead.

11. The wheelhouse structure of claim 1, wherein the inner panel and outer panel comprise steel.

12. A vehicle including the wheelhouse structure of claim 1.

13. The wheelhouse structure of claim 12, wherein when the outer panel bends in locations proximate to the first stiffening bead more easily than in locations remote from the first stiffening bead, the bending prevents the inner panel and outer panel from contacting a fuel pipe of the vehicle.

14. A method comprising:
    providing a wheelhouse inner panel, comprising an inner flange that includes a first substantially straight portion;
    providing a wheelhouse outer panel comprising:
        an outer flange sized and shaped to interface with the inner flange along at least a second substantially straight portion in contact with the first substantially straight portion;
        a first stiffening bead situated forward from the second substantially straight portion; and
    coupling the inner flange to the outer flange with a plurality of joins;
    providing a first gap in the plurality of joins, wherein the first gap is aligned with the first stiffening bead, wherein when a rear portion of the outer panel is subjected to a loading force in a forward direction, the outer panel bends in locations proximate to the first stiffening bead more easily than in locations remote from the first stiffening bead.

15. The method of claim 14, wherein the inner panel and outer panel comprise steel, wherein the plurality of joins comprise spot welds, and wherein a pitch of the plurality of joins is greater within the first and second substantially straight portions.

16. The method of claim 14, wherein the outer panel further comprises a second stiffening bead situated aft from the second substantially straight portion, wherein the method further comprises providing a second gap in the plurality of joins, wherein the second gap is aligned with the second stiffening bead.

17. The method of claim 16, wherein the first and second stiffening beads are radially oriented, and are formed by stamping, embossing, or welding.

18. The method of claim 16, further comprising providing a lower seam comprising a lower plurality of joins, wherein the lower seam couples the outer panel to a body panel of a vehicle, wherein the lower plurality of joins includes no joins located between radial positions of the first stiffening bead and second stiffening bead.

19. A system for distributing crash energy within a vehicle, comprising:

the vehicle;
a wheelhouse structure of a vehicle, comprising:
   a metallic inner panel, comprising an inner flange that includes a first substantially straight portion;
   a metallic outer panel comprising:
      an outer flange sized and shaped to interface with the inner flange along at least a second substantially straight portion in contact with the first substantially straight portion;
      a first radially oriented stiffening bead situated forward from the second substantially straight portion;
      a second radially oriented stiffening bead situated aft from the second substantially straight portion;
   a plurality of joins coupling the inner flange to the outer flange;
   a first gap in the plurality of joins, wherein the first gap is aligned with the first stiffening bead; and
   a second gap in the plurality of joins, wherein the second gap is aligned with the second stiffening bead,
wherein when a rear portion of the wheelhouse structure is subjected to a loading force in a forward direction, the outer panel bends in locations proximate to the first stiffening bead or proximate to the second stiffening bead more easily than in locations remote from the first stiffening bead.

* * * * *